INVENTOR.
DAVID E. SUNSTEIN
BY
Allen V. Hazeltine
ATTORNEY

INVENTOR.
DAVID E. SUNSTEIN
BY
Allan V. Hazeltine
ATTORNEY

Jan. 22, 1957 D. E. SUNSTEIN 2,778,971

INDEXING SYSTEM FOR COLOR TELEVISION

Filed Jan. 25, 1952 3 Sheets-Sheet 3

INVENTOR.
DAVID E. SUNSTEIN
BY
Allen V. Hazeltine
ATTORNEY

United States Patent Office 2,778,971

Patented Jan. 22, 1957

2,778,971

INDEXING SYSTEM FOR COLOR TELEVISION

David E. Sunstein, Cynwyd, Pa., assignor to Philco Corporation, Philadelphia, Pa., a corporation of Pennsylvania Application January 25, 1952, Serial No. 268,306

25 Claims. (Cl. 315—12)

The present invention relates to electrical systems and more particularly to cathode-ray tube systems comprising a beam intercepting structure and indexing means arranged in cooperative relationship with the beam intercepting structure and adapted to produce a signal whose time of occurrence is indicative of the position of the cathode-ray beam.

The invention is particularly adapted for and will be described in connection with a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of different primary colors. The order of arrangement of the stripes may be such that the normally horizontally scanning cathode-ray beam produces red, green and blue light successively. The stripes may be uniformly distributed over the surface of the image forming area of the screen to produce a so-called three-line screen structure. Alternatively, the stripes may be arranged in spaced groups as later to be more fully referred to, to thereby produce a so-called four-line screen srtucture. In the former instance, the stripes are effectively displaced 120° apart, whereas in the latter instance, the stripes may be considered as being displaced 90° apart.

To energize a screen of either of the foregoing types, there may be supplied from a color television receiver three separate video signals, each indicative of a different primary color component of a televised scene, which signals are sequentially utilized to control the intensity of the cathode-ray beam. For proper color rendition, it is then required that, as the phosphor stripes producing light of each of the primary colors are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to a non-uniform distribution of the phosphor stripes on the screen surface, a phase synchronous relationship between the signal applied to the intensity control system of the cathode-ray beam and the scanning of the beam must be continuously reestablished. Such a synchronous relationship may be maintained throughout the scanning cycle by deriving, from the beam intercepting structure, indexing signals indicative of the instantaneous position of the cathode-ray beam upon the image forming screen, and by utilizing these indexing signals to control the relative phase of the signal applied to the beam intensity controlling system or to appropriately vary the rate at which the beam scans successive color triplets. The said indexing signals may be derived from a plurality of stripe like elemental areas arranged on the beam intercepting screen structure with a geometric configuration indicative of the geometric disposition of the color triplets so that, when the beam scans the screen, the said elemental areas are excited in synchronism with the scanning of the color triplets and a series of pulses is generated in a suitable output electrode system of the cathode-ray tube.

These elemental areas may be in the form of stripes of a material having secondary-electron emissive properties which differ from the secondary-electron emissive properties of the material of the portions of the beam intercepting structure arranged between the indexing stripes. For example, the indexing stripes may consist of a material having a relatively high secondary-electron emissivity, such as gold, platinum or tungsten or other high atomic number metal, or may consist of certain oxides such as cesium oxide or magnesium oxide. Alternatively, the indexing stripes may consist of a material having a secondary-electron emissivity detectably less than the secondary-electron emissivity of the intervening portions of the beam intercepting member, as later to be more fully discussed. With such arrangements the indexing signals may be derived from the beam intercepting structure by means of a suitable conducting lead connected thereto or from a collector electrode arranged in the vicinity of the screen structure.

As a further alternative, the indexing stripes may consist of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

It has been the practice to construct the beam intercepting structure so as to provide one indexing stripe for each of the color triplets. In the case of the three-line screen structure above referred to, this single stripe may be arranged so as to coincide with one of the color stripes of the triplet, either being positioned over the color stripe or being made integral therewith, for example by appropriately mixing the material of the indexing stripe and the phosphor material and codepositing the same in the desired configuration on the screen structure. In the case of the four-line screen structure above referred to, the single index stripe may be arranged adjacent to its corresponding color triplet, the space between adjacent groups of phosphor stripes being used to accommodate the indexing stripe.

It has been found that, with such a construction, the fundamental component of the indexing signal generated, as established by the rate at which the beam scans the indexing stripes, has a phase which depends not only on the position of the beam when it is centered on the indexing stripe but also, upon the strength of the beam when it is positioned on the adjacent color stripes. To avoid this misphase of the generated indexing signal, it has been proposed to neutralize or otherwise cancel the undesired phase variations by combining with the indexing signal a compensating component derived from the video signal applied to the cathode-ray tube. However, in some instances, particularly where the image reproducing screen contains a large number of color triplets such as are required for reproducing large size images, the repetition rate of the indexing signal is sufficiently high so that the transit time effects and variations of the transit time due to variations of the beam current and of the beam position, become significant and make it difficult to achieve the desired cancellation throughout the scanning area.

It is an object of the invention to provide improved cathode-ray tube systems of the type in which the position of an electron beam on a beam intercepting screen structure is indicated by an indexing signal derived from the indexing member.

A further object of the invention is to provide a cathode-ray tube system of the foregoing type in which an indexing signal free from spurious phase variations is produced.

Another object of the invention is to provide a cathode-ray tube system of the foregoing type capable of producing indexing signals of large amplitude value and images of high intensity.

Further objects of the invention will appear as the specification progresses.

In accordance with the invention, the foregoing objects are achieved, in a cathode-ray tube system of the above described type, by means of an index signal generating system adapted to produce a main indexing signal having a peak for each line stripe element of the beam intercepting member. Such a main indexing signal is preferably generated by means of a beam intercepting screen structure adapted to produce directly a signal peak for each of the line stripe elements of the screen structure. Alternatively such a signal may be generated by means of a beam intercepting structure adapted to produce a signal peak for each group of line stripe elements, and circuit means may be provided to derive the appropriate harmonic component of the signal peak. More specifically, and in a preferred arrangement of the invention, in a cathode-ray tube system in which the beam intercepting screen structure comprises consecutively arranged phosphor stripes of three different primary colors constituting a plurality of color triplets or groups, the screen structure may be formed with spaced phosphor stripes, the intervening elemental areas of which directly produce a main indexing signal having peak values recurring at the frequency at which the individual phosphor stripes are scanned. Since each group contains three phosphor stripes, the indexing signal has a frequency equal to three times the rate at which the color triplets are scanned. In this arrangement, the further advantage is achieved that, by spacing the consecutive phosphor stripes so as to expose the underlying base of the screen structure, the difference in secondary-electron emissivity between the materials of the phosphor stripes and of the base may be used to produce the desired indexing signals.

In an alternate arrangement, the beam intercepting screen structure is constructed to produce an index signal peak for each color triplet, and the indexing system comprises suitable frequency selective circuits to derive from the generated pulses a harmonic signal which is a whole number multiple of the rate at which the individual phosphor stripes are scanned. Thus, in the case of a three-line tube having one index stripe for each triplet and thereby generating one index pulse during the scanning of each triplet, there is provided an indexing system adapted to produce an output indexing signal having a repetition rate equal to three—or multiples of three—times the repetition rate of the initially generated index signal. In the case of a four-line tube having an indexing area arranged adjacent to each group of three phosphor stripes and thereby generating one index pulse for each color triplet, there is provided an indexing system adapted to produce an output indexing signal having a repetition rate of four—or multiples of four—times the repetition rate of the initially generated index signal.

The indexing signals produced in either of the above described manners may be used to synchronize a suitable oscillation source establishing a phase synchronous relationship between the signal applied to the beam intensity varying system of the cathode-ray tube and the scanning of the beam over the phosphor stripes of the image reproducing screen structure of the tube.

While the indexing signals so produced are phase invarient in the presence of video signal modulation of the beam of the cathode-ray tube, as a general rule these signals contain no readily recognizable information establishing the absolute phase position of the generated pulses with respect to the phosphor stripes of a particular color. In accordance with a further feature of the invention, a phase ambiguity between the indexing signal and the scanning of the phosphor stripes is avoided by constructing the indexing system so as also to provide an auxiliary indexing signal having a repetition rate equal to the rate of scanning the color triplets, and by controlling the above-noted oscillation source with this auxiliary indexing signal during at least a portion of the scanning interval.

In one arrangement in accordance with the invention, this auxiliary indexing signal may be produced by means of a beam intercepting screen structure, the image forming portion of which is provided with a marginal edge portion adapted to generate directly the desired signal by means of suitably positioned index stripes. In a further embodiment of the invention, the indexing system may comprise suitable circuitry whereby, as the beam impinges the marginal edge portion of the beam intercepting structure, an indexing signal having peaks recurring only at the rate of scanning the color triplets is generated.

In order to enhance the brightness of the image produced, and in accordance with a further feature of the invention, the cathode-ray beam is periodically retarded during each line scan so that the beam impinges the consecutive phosphor stripes for a period longer than it normally does when the phosphor stripes are scanned at a constant velocity rate. For so periodically retarding the scanning beam, the system of the invention embodies a source of an auxiliary beam deflection field the variations of which bring about a net deflection field which is almost constant in intensity periodically at intervals occurring in synchronism with the impingement of the beam on the consecutive phosphor stripes.

The invention will be described in greater detail with reference to the appended drawings forming part of the specification and in which.

Figure 1:
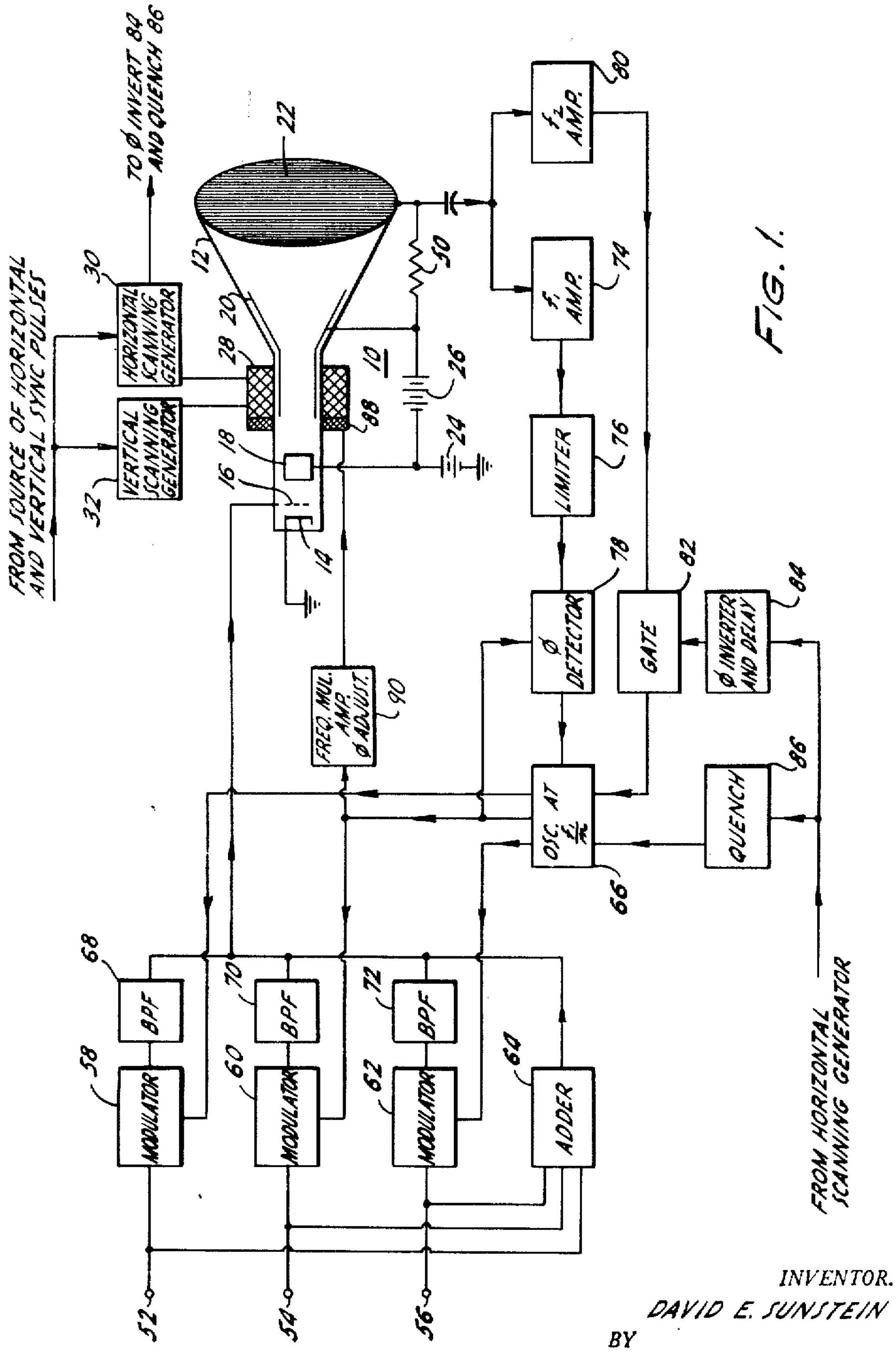
Figure 1 is a block diagram, partly schematic, showing one form of a cathode-ray tube system in accordance with the invention.

Referring to Figure 1, the cathode-ray tube system there shown comprises a cathode-ray tube 10 containing, within an evacuated envelope 12, a conventionally constructed beam generating and accelerating electrode system comprising a cathode 14, an electrode 16 for varying the intensity of the beam, a focusing electrode 18 and a beam accelerating electrode 20 which may consist of a conductive coating on the inner wall of the envelope and which terminates at a point spaced from the end face 22 of the tube in conformance with well established practice. Suitable means (not shown) are provided for maintaining the cathode 14 at its operating temperature. The electrode system so defined is energized by a suitable source of potentials shown as batteries 24 and 26; the battery 24 having its negative pole connected to ground and its positive pole connected to the electrode 18, and the battery 26 having its negative pole connected to the positive pole of the battery 24 and its positive pole connected to the accelerating electrode 20. In practice, the battery 24 has a potential of the order of 1 to 3 kilovolts whereas the battery 26 has a potential of the order of 10 to 20 kilovolts.

A deflection yoke 28, coupled to horizontal and vertical deflection generators 30 and 32 of conventional design, is provided for deflecting the generated electron beam across the face plate 22 of the cathode-ray tube to form a raster thereon.

Figure 2:
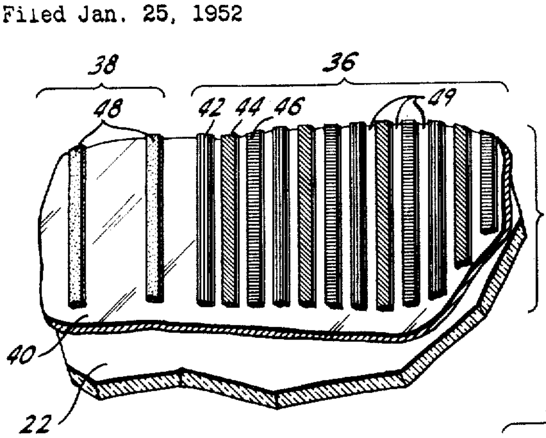
Figures 2, 3, 4 and 5 are cross-sectional views each of a portion of one form of a beam intercepting structure suitable for the cathode-ray tube systems of the invention.

The end face 22 of the tube is provided with a beam intercepting structure, one suitable form of which is shown as 34 in Figure 2. In the arrangement shown in Figure 2, the structure 34 is formed directly on the face plate 22. However, the structure 34 may alternatively be formed on a suitable light transparent base which is independent of the face plate 22 and may be spaced therefrom. In the arrangement shown, the face plate 22, which in practice consists of glass having preferably substantially uniform transmission characteristics for the various colors of the visible spectrum, and having a light transparent conductive coating 40 which may be a coating of stannic oxide or a coating of a metal, such as silver, having a thickness only sufficient to achieve the desired conductivity, is provided with an image forming portion 36 and a marginal edge portion 38. The image forming portion 36 comprises a plurality of parallelly arranged stripes 42, 44 and 46 of phosphor materials which, upon impingement of the cathode-ray beam, fluoresce to produce light of three different primary colors. For example, the stripe 42 may consist of a phosphor such as zinc phosphate containing manganese as an activator, which upon electron impingement produces red light, the stripe 44 may consist of a phosphor such as zinc orthosilicate, which produces green light, and the stripe 46 may consist of a phosphor such as calcium magnesium silicate containing titanium as an activator, which produces blue light. Other suitable materials which may be used to form the phosphor stripes 42, 44 and 46 are well known to those skilled in the art, as well as methods of applying the same to the face plate 22, and further details concerning the same are believed to be unnecessary.

Each of the groups of stripes may be termed a color triplet and, as will be noted, the sequence of the stripes is repeated in consecutive order over the area of the structure 34. It will further be noted that adjacent stripes are spaced apart and thereby expose the coating 40 at a plurality of elemental areas 49 having a periodicity equal to the periodicity of the phosphor stripes.

The marginal edge portion 38 of the structure 34 comprises a plurality of indexing stripes 48 consisting of a material having a secondary-electron emissive ratio detectably different from the secondary-electron emissive ratio of the materials of the underlying coating 40 and face plate 22. Stripes 48 may consist of gold or other high atomic number metals such as platinum or tungsten, or may consist of an oxide, such as magnesium oxide.

The stripes 48 are arranged parallel to the phosphor stripes 42, 44 and 46 and the spacing between stripes 48 is equal to the spacing between phosphor stripes of a given color of two of the adjacent color triplets. The spacing between the end stripe 48 and the adjacent elemental area 49, as well as the purposes of the stripes 48 and of the areas 49, will be discussed later in detail.

The structure 34 so constituted is connected to the positive pole of the battery 26 by means of a suitable lead connected to the conductive coating 40, the said connection being made through a suitable load impedance shown as a resistor 50.

For the reproduction of a color image on the face plate of the cathode-ray tube, there are provided color signal input terminals 52, 54 and 56 which are supplied from a color television receiver with separate signals indicative of the red, green and blue components of the televised scene, respectively. The system then operates effectively to convert these three color signals into a wave having the color information arranged in time reference sequence so that the red information occurs when the cathode-ray beam impinges the red stripes 42 of the beam intercepting structure 34, the green information occurs upon impingement of the green stripes 44, and the blue information when the blue stripes 46 are impinged.

The conversion of the color signals into a wave having the color information arranged in the time reference sequence above noted, may be achieved by a modulation system suitably energized by the respective signals and by appropriately phase related modulation signals. In the arrangement specifically shown in Figure 1, the desired conversion is effected by means of sine wave modulators 58, 60 and 62 in conjunction with an adder 64. Modulators 58, 60 and 62 may be of conventional form and may each consist, for example, of a dual grid thermionic tube, to one grid of which is applied the color signal from one of terminals 52, 54 and 56, and to the other grid of which is applied an individual modulation signal. The modulation signals are derived from an oscillator 66 embodying a suitable phase shifting network adapted to produce three modulation voltages appropriately phase displaced. In the arrangement above specifically described in Figure 2, in which the phosphor stripes 42, 44 and 46 are substantially uniformly distributed throughout the width of each color triplet and in which the spacing between stripes of one triplet is equal to the spacing between adjacent stripes of adjacent triplets, the modulation voltages from the oscillator 66 bear a 120° phase relationship.

The individual waves produced at the outputs of the modulators, after passing through filters 68, 70 and 72, are sine waves, each amplitude modulated by the color signal applied to the respective modulator and each having a phase relationship determined by the particular modulation signal applied. The filters 68, 70 and 72 are coupled with their outputs in common whereby the three waves are combined to produce a resultant wave having a frequency at the frequency of oscillator 66 and having amplitude and phase variations proportional to the variations of the amplitudes of the color signals at terminals 52, 54 and 56.

The frequency of the waves generated by the modulators 58, 60 and 62 and established by the oscillator 66 is determined by the rate of scanning the color triplets of the beam intercepting structure 34. For example, when scanning the color triplets at an average rate of 7 million per second, as determined by the scanning frequency applied to the horizontal deflection coil of the deflecting system 28 and by the number of effective color triplets contained on the surface of the face plate 22, the oscillator 66 has a nominal frequency of 7 mc./sec., and similarly the frequency of the waves from the filters 68, 70 and 72 and the resultant wave produced by their common interconnection will have this nominal frequency value.

Each of the color signals applied to the input terminals of modulators 58, 60 and 62 will, in general, include a reference level component definitive of brightness. While each of the modulators above specifically described will normally transmit this reference level component to its output, in practice it is preferable to process this component separately and exclude it from the outputs of the modulators by means of the band-pass filters 68, 70 and 72 respectively. For separately processing the brightness components, each of the color signals is applied as an input to the adder 64 where they may be combined in proper proportions to yield a single signal representative of the overall brightness of the image to be reproduced, and this signal is in turn combined with the outputs of the modulators.

When such a signal is applied as an intensity control quantity for the cathode-ray beam in proper phase time sequence to the scanning of the color triplets, it will cause the phosphor stripes of consecutively scanned color triplets to be excited to their proper color determining light output. In scanning the phosphor stripes, the beam will also impinge on the exposed areas 49 of the screen structure 34 intermediate the phosphor stripes. In practice, the secondary-electron emissivity of the face plate 22 and the superimposed coating 40 is different from the secondary-electron emissivity of the phosphor stripes 42, 44 and 46, or can be made to be different by suitably modifying one or the other of these components, for example by mixing magnesium oxide, tungsten powder or the like with the material of the phosphor stripes to thereby increase the secondary-electron emissivity of the phosphor stripes relative to that of the intervening exposed portions 49. When the beam scans the portion 36 in its horizontal travel across the beam intercepting structure 34, a series of pulses is generated across the load impedance 50. These pulses will be in phase with the scanning of the phosphor stripes when the secondary-electron emissivity of the stripes is greater than that of the intervening areas 49, or will be in phase with the scanning of the areas 49 when the secondary-electron emissivity thereof is greater than that of the phosphor stripes. Since three of these pulses are produced during the scanning of each color triplet, the frequency of the pulses has a nominal fundamental value equal to three times the rate at which the color triplets are scanned. Hence the frequency of the pulses has a nominal value equal to three times the frequency of the sine wave component of the video color signal applied to the beam intensity control electrode 16 of the cathode-ray tube 10. Under these conditions the indexing signal produced across load impedance 50 exhibits phase (and/or frequency) variations determined solely by variations in the rate of scanning the consecutive color triplets and is independent of the intensity variations of the electron beam due to the color video signal impressed thereon. Furthermore, the phase of harmonics of the series of pulses so generated is independent of intensity variations of the beam, and accordingly a signal derived as a harmonic component of these pulses may be used as an indexing signal indicative of the position of the beam on the beam intercepting structure. When the system shown in Figure 1 embodies a screen structure of the type shown in Figure 2, the generated pulses are used at their fundamental frequency value as an indexing signal and this signal is utilized to bring about the desired synchronism between the contemporaneous value of the video signal applied to the control electrode 16 and the scanning of the phosphor stripes. This desired synchronism may be achieved by appropriately controlling the phase position of the composite wave generated by the modulators 58, 60 and 62 by varying the relative phase of the wave generated by oscillator 66 in consonance with the phase (and/or frequency) variations of the index signal generated across the load impedance 50. For this purpose, the index signal is applied to a band-pass amplifier 74 tuned to the fundamental frequency of the generated pulses, i. e., tuned to 21 mc./sec., and then to a limiter 76 by means of which amplitude variations of the index signal are removed. Amplifier 74 may be of conventional form and is adapted to raise the level of the index signal to a conveniently usable value without distortion of the applied input signal. The indexing signal from the limiter 76 may then be applied as a control signal to vary the phase (and/or frequency) of the oscillator 66 to produce the desired phase variations of the modulating signals generated thereby. The control of oscillator 66 may be effected by means of a phase detector 78, to which an output signal from oscillator 66 and the signal from limiter 76 are applied. While the signal from oscillator 66 and that from limiter 76 have a frequency ratio of 3:1, and therefore a phase difference between these signals cannot be determined in the strict literal meaning of this term, as a practical matter the phase detector does operate to produce an output signal indicative of the "phasal relationship" between these signals whereby presumably, the phase of each cycle of the generated wave from oscillator 66 is compared with the phase of each third cycle of the signal from limiter 76. The output of the phase detector 78 may be of the form of an AFC potentiometer which, when applied to the oscillator 66, serves to control the phase (and/or frequency) thereof proportionally to the departures of the phase (and/or frequency) of the index signal from its nominal value.

The oscillator 66 and phase detector 78 may be of conventional form and may be contained in a one unit system as in the case of the controlled oscillator which is disclosed in the copending application of Joseph C. Tellier, Serial No. 197,551, filed November 25, 1950, now Patent No. 2,740,046 and which is suitable for the purposes of the present invention.

While the indexing signal derived from limiter 76 is immune to phase variations due to variations of the intensity of the cathode-ray beam, there is no information in this signal readily adapted to establish the absolute phase position of the signals produced by oscillator 66. Therefore there exists the possibility that the oscillator 66 may synchronize with a peak of the indexing signal other than the desired peak to produce a 120° phase ambiguity.

In accordance with a further feature of the invention, the possibility of such a phase ambiguity is obviated by insuring that, at the start of each scanning line, the absolute phase of the signals from the oscillator 66 has a value at least approximately equal to the proper value. More particularly, the system of the invention embodies means to produce an auxiliary indexing signal having a frequency equal to the rate at which the color triplets are scanned by the beam, and by means of which the peaks of the signal generated by the oscillator 66 are established at a time-phase position insuring that the oscillator is synchronized with the proper peak of the main indexing signal. When the system shown in Figure 1 embodies a screen structure as shown in Figure 2, such an auxiliary indexing signal may be generated by means of the auxiliary indexing stripes 48 arranged at the marginal edge portion of the beam intercepting structure 34. The stripes 48 have a periodicity equal to the periodicity of the color triplets of the image forming portion 36 of the structure 34 so that the signal pulses generated thereby across the load impedance 50 recur at a nominal frequency equal to the nominal frequency of the oscillator 66. The absolute position of the stripes 48 is determined by the secondary-electron emissivity thereof relative to that of the underlying base, by the secondary-electron emissivity of the elemental areas 49 relative to that of the phosphor stripes, and by the times of occurrence of the peaks of the main indexing signal with which the auxiliary indexing signal is to be synchronized. More particularly, assuming that the phosphor stripes 42, 44 and 46 and the auxiliary indexing stripes 48 have secondary-electron emissivities greater than that of the underlying base and that the peak of the auxiliary index signal is to be synchronized in phase with that peak of the main indexing signal which occurs at the instant that the phosphor stripe 44 is scanned, then the stripes 48 should be arranged so that the stripe 48, which is positioned adjacent to the image forming portion 36, is spaced from the phosphor stripe 44 a distance equal to the spacing between the stripes 44 of the consecutive color triplets. This assumed construction has been specifically shown in Figure 2.

The auxiliary index signal produced during the scanning of the marginal edge portion 38 of the screen structure 34 is applied as a synchronizing signal to the oscillator 66 at the start of each of the line scansions of the image to be reproduced and for this purpose the load impedance 50 is coupled to the oscillator 66 through a band-pass amplifier 80 tuned to the nominal frequency of the auxiliary indexing signal, and a gate 82 which is opened during the initiation of the scanning period. Gate 82 is of conventional form and may conveniently consist of a dual grid discharge tube, to one grid of which is applied the auxiliary indexing signal from band-pass amplifier 80 and to a second grid of which is applied a negative potential normally maintaining the tube in a non-conducting condition. By means of a positive pulse signal applied to the said second grid, the tube may be made selectively conductive so that the auxiliary indexing signal is made to appear at the output circuit of the tube coupled to the oscillator 66. The pulse for opening the gate 82 may be derived from the horizontal scanning generator 30 initially in the form of a negative pulse which normally exists in the circuits of generator 30 at the end of each horizontal scanning period. By means of a phase inverter and delay network 84, the polarity and time of occurrence of the so derived pulse signal is modified to the requirements of the gate 82.

In order to facilitate the control of the oscillator 66 by the auxiliary indexing signal, the oscillator is quenched at the end of each line scanning period. In the system shown in Figure 1 this is effected by means of the above-described negative pulses from the horizontal scanning generator 30. For example, the said negative pulses may be applied to generator 66 through a quench system 86 which conveniently may consist of an amplifier the output of which is coupled to a control electrode of oscillator 66 and applies thereto negative blocking pulses which periodically quench the oscillator at the end of each line scansion of the cathode-ray beam.

Figure 6:
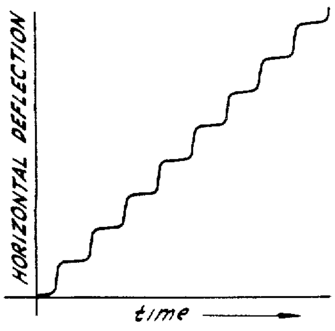
Figure 6 is a graph illustrating the time-position relationship of the scanning beam in accordance with one embodiment of the cathode-ray tube systems of the invention.

In order to increase the brightness of the image generated by the beam intercepting structure 34, the system shown in Figure 1 is arranged so that the scanning beam is momentarily retarded as it impinges on each of the phosphor stripes 42, 44 and 46 during its horizontal travel across the surface of the structure 34. In accordance with a further feature of the invention, this is achieved by superimposing on the horizontal deflection field of the cathode-ray beam an auxiliary field which varies in intensity in synchronism with the scanning of the successive phosphor stripes. Such an auxiliary field may be provided by means of an auxiliary deflection coil 88 energized by a sine wave signal derived from the oscillator 66 through a frequency tripling amplifier and phase adjuster 90. The resultant field acting on the cathode-ray beam has amplitude variations as shown in Figure 6 from which it will be noted that the combination of the normal horizontal deflection field and the superimposed auxiliary field causes a net deflection field which momentarily assumes almost constant values at a series of consecutive instants. These intervals, at which the resultant field remains almost constant, may be adjusted to occur at the instant the beam impinges the phosphor stripes by appropriately adjusting the phase of the signal from the amplifier system 90. It should further be noted that when the image forming portion 36 is constituted as above specifically described, whereby the indexing pulses are generated by impingement of the phosphor stripes, the longer dwell period brought about by the auxiliary deflection field also enhances the amplitude of the index signal generated.

Figure 3:
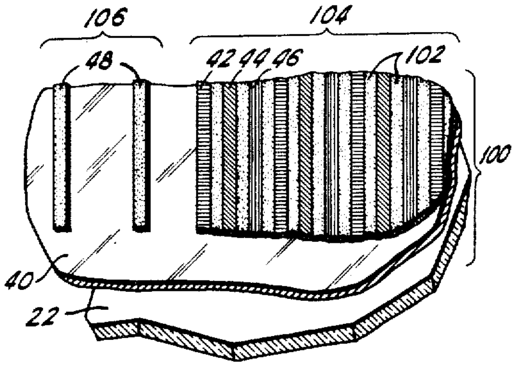

While the system of Figure 1 has been specifically described with reference to a beam intercepting structure constructed as shown in Figure 2, it is apparent that other forms of screen structures are equally applicable. More particularly, in the structure of Figure 2 the pulses constituting the main indexing signal are a result of the greater secondary-electron emissivity of the phosphor stripes than of the underlying material exposed between pairs of phosphor stripes. However, it is apparent that the desired index signals may also be produced by pulses attributable to indexing stripes arranged between the phosphor stripes as shown in Figure 3 and having a greater secondary electron emissivity than the phosphor stripes. In Figure 3, the beam intercepting screen structure has been shown as 100 and may comprise indexing stripes 102 which are arranged between the consecutive phosphor stripes 42, 44 and 46 of the image forming portion 104 of the beam intercepting structure and which exhibit a secondary-electron emissivity greater than that of the phosphor stripes. The indexing stripes 102 may consist of a material such as a high atomic number metal such as gold or tungsten or of an oxide such as magnesium oxide as explained above in connection with the auxiliary indexing stripes 48 of the structure shown in Figure 2. The structure 100 further comprises a marginal edge portion 106 for developing an auxiliary indexing signal at the start of each scanning line, this portion 106 being provided with indexing stripes 48 as previously described. In view of the greater secondary-electron emissivity of the stripes 102 than of the phosphor stripes, the desired phase relationship between the auxiliary indexing signal and the main indexing signal is brought about by so positioning the stripes 48 that the stripe 48 nearest the portion 104 is spaced from the first impinged index stripe 102 by a distance equal to the distance between adjacent stripes 48. The remainder of the screen structure shown in Figure 3 is similar to that shown in Figure 2 and the same numbers have been used to indicate the similar components.

In the system so far described, a main indexing signal harmonically related to the rate at which successive groups of phosphor stripes are scanned, and hence harmonically related to the frequency of the video signal which varies the intensity of the beam, is generated directly by a beam intercepting structure adapted to produce a pulse for each phosphor stripe of the screen structure. A harmonically related indexing signal free from phase variations due to the video signal may also be generated in accordance with the invention by means of a beam intercepting structure adapted to produce a pulse for each group of phosphor stripes, i. e., for each triplet. More particularly, it has been found that the pulses generated by the indexing elements of the beam intercepting structure normally contain higher order harmonics. By means of a suitable band-pass system, a main indexing signal may be derived having a frequency equal to an appropriate harmonic of the generated pulses as determined by the number and disposition of the phosphor stripes, which harmonic signal is free from undesired phase variations.

Figure 4:
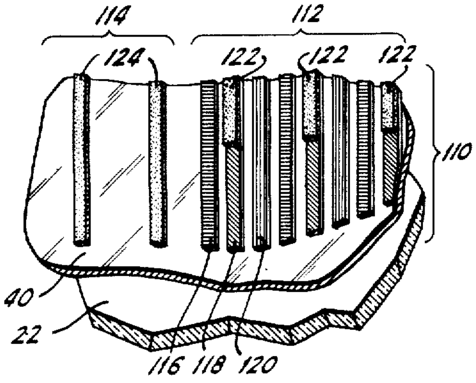

One form of beam intercepting structure adapted for operation of the system of the invention in the manner above described is shown in Figure 4. The structure there shown comprises a beam intercepting structure 110 having an image reproducing portion 112 and a marginal edge portion 114, the portions 112 and 114 being arranged on a face plate 22 having a conductive coating 40 as previously described. The image reproducing portion 112 comprises a plurality of parallelly arranged, uniformly distributed stripes 116, 118 and 120 of phosphor materials similar to the phosphor stripes 42, 44 and 46 of the structures shown in Figures 2 and 3. Each group of stripes may be termed a color triplet and, as will be noted, the sequence of the stripes is repeated in consecutive order over the area of the portion 112 of the structure 110.

Arranged over each of the stripes 118 are indexing stripes 122 consisting of a material having a secondary-electron emissive ratio detectably different from the secondary-electron emissive ratio of the materials of the remainder of the image forming portion 112. Stripes 122 may be of gold or other high atomic number metals such as platinum or tungsten, or may be of an oxide such as magnesium oxide as previously pointed out.

As the cathode-ray beam scans the portion 112 it produces a series of pulses, the repetition rate of which is equal to the rate at which successive color triplets of the phosphor stripes 116, 118 and 120 are scanned. By selecting the third harmonic component—or multiples of the third harmonic component—of the generated pulses, when the phosphor stripes are arranged with a distribution as above described, it has been found that an indexing signal which is free from undesired phase variations may be derived. Such a harmonic component may be derived from the generated pulses by the band-pass amplifier 74, and the main indexing signal so produced may be used to synchronize the operation of the oscillator 66 in the manner previously described.

Since a main indexing signal at a third harmonic of the color triplet frequency, may synchronize the oscillator 66 at a time phase instant 120° removed from the proper instant, in accordance with a further feature of the invention an auxiliary indexing signal recurring at the triplet frequency is applied to the oscillator 66 during the period that the beam scans the marginal edge portion of the beam intercepting structure. For producing the auxiliary indexing signal, the marginal edge portion 114 of the structure of Figure 4 comprises auxiliary indexing stripes 124 which may be similar to the indexing stripes 48 previously described and which are arranged with a periodicity equal to the periodicity of the color triplets and are spaced in phase with the indexing stripes 122.

Figure 5:
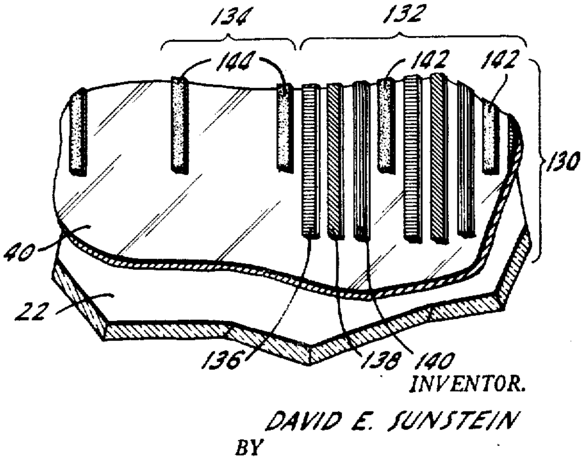

In each of the screen structures shown in Figures 2, 3 and 4 the phosphor stripes are uniformly distributed over the surface of the image forming portion of the screen structure, i. e., the phosphor stripes occupy positions spaced 120° apart and the three modulating signals applied to the modulators 58, 60 and 62 by oscillator 66 accordingly bear a 120° relationship. The system of the invention as shown in Figure 1 is also applicable to cathode-ray tubes having a screen structure in which the phosphor stripes are arranged with other distributions, for example with a spacing of 90° between phosphor stripes of a given triplet as found in the so-called four-line screen. Such a screen structure is shown in Figure 5 in which a screen structure shown as 130 is arranged on a face plate 22 carrying a conducting coating 40, as previously described, and comprises an image forming portion 132 and a marginal edge portion 134. The portion 132 comprises a plurality of parallelly arranged stripes 136, 138 and 140 of phosphor materials adapted to produce light of three different primary colors. The phosphor stripes are arranged in groups and the sequence of the stripes is repeated in consecutive order over the area of the structure 34, the consecutive groups being spaced apart to accommodate indexing stripes 142. Indexing stripes 142 may consist of a material of the type previously described in connection with the indexing stripes 48 of Figure 2 and the width of the stripes 142 preferably is made the same as that of the phosphor stripes 136, 138 and 140. The structure so formed may be termed a four-line structure since it comprises stripes spaced effectively at 90° intervals, i. e., stripe 136 may be considered to be positioned at a 0° phase position, stripe 138 at a 90° phase position, and stripe 140 at a 180° phase position. The indexing stripe 142 completes the cycle and this stripe may be considered to be positioned at the 270° phase position.

To adapt the system of Figure 1 to operate with a screen structure of the type shown in Figure 5 a corresponding change is made in the operating characteristics of the amplifier 74, the oscillator 66 and the frequency multiplier and amplifier 90. More particularly, in accordance with the principles outlined above and specifically referred to in connection with the screen structure of Figure 4, the amplifier 74 is constructed to transmit solely that component of the pulses generated by index stripes 142 having a frequency harmonically related to the rate of scanning the groups of phosphor stripes as determined by the number and position of the phosphor stripes. More particularly, since in the arrangement of Figure 5 the phosphor stripes of each group are arranged at quarterly intervals, the amplifier 74 is constructed with a band-pass characteristic for selecting the fourth harmonic—or harmonics of the fourth harmonic—component of the pulses generated by the indexing stripes 142. This harmonic component is free from variations due to the video information impressed on the cathode-ray beam and may be used as a main indexing signal for controlling the oscillator 66 through the intermediary of a phase detector 78 as previously described. The characteristics of oscillator 66 are modified from those previously described to the extent that the output thereof provides three modulating signals phase displaced by 90°, i. e., a first signal at 0° phase position, a second signal at 90° phase position and a third signal at 180° phase position. These signals are applied to the modulators 58, 60 and 62 in the manner previously described so that the combined wave of the modulators is representative of the color information in a phase sequence corresponding to the phase sequence of the phosphor stripes 136, 138 and 140.

To avoid a phase ambiguity, such as would occur if the oscillator 66 were to be synchronized with the wrong peak of the main indexing signal from amplifier 74, the oscillator 66 is synchronized in proper phase at the start of each scanning line by means of an auxiliary indexing signal produced during the scanning of the marginal edge portion 134 of the structure 130. Such an auxiliary indexing signal may be generated by means of indexing stripes 144 arranged on the coating 40 and having a periodicity equal to that of the indexing stripes 142 of the image producing portion 132. The stripes 144 may be of a material similar to that of stripes 142 and stripes 48 previously described. Similarly the stripe 144, immediately adjacent to the phosphor stripes, is spaced from the first of the stripes 142 by an amount equal to the spacing between stripes 142 so that the stripes 142 and 144 are effectively in phase. The auxiliary indexing signal so produced is applied to the oscillator 66 through the amplifier 80 and the gate 82 as previously described.

To enhance the brightness of the image, the beam is momentarily retarded as it impinges on the successive phosphor stripes 136, 138 and 140. This may be effected by modifying the characteristics of the frequency multiplier 90 to the extent that the output signal thereof, which is applied to the auxiliary deflection coil 88, has a frequency equal to four times the frequency of the signals generated by oscillator 66. Under these conditions the horizontal deflection field applied to the scanning beam has the characteristic shown in Figure 6 with the portions thereof having a substantially horizontal slope recurring in synchronism with the scanning of the phosphor stripes. In this arrangement, the beam is also momentarily retarded at the instant it impinges on the index stripes 142 and thereby an index pulse of relatively large amplitude is produced.

Figure 7:
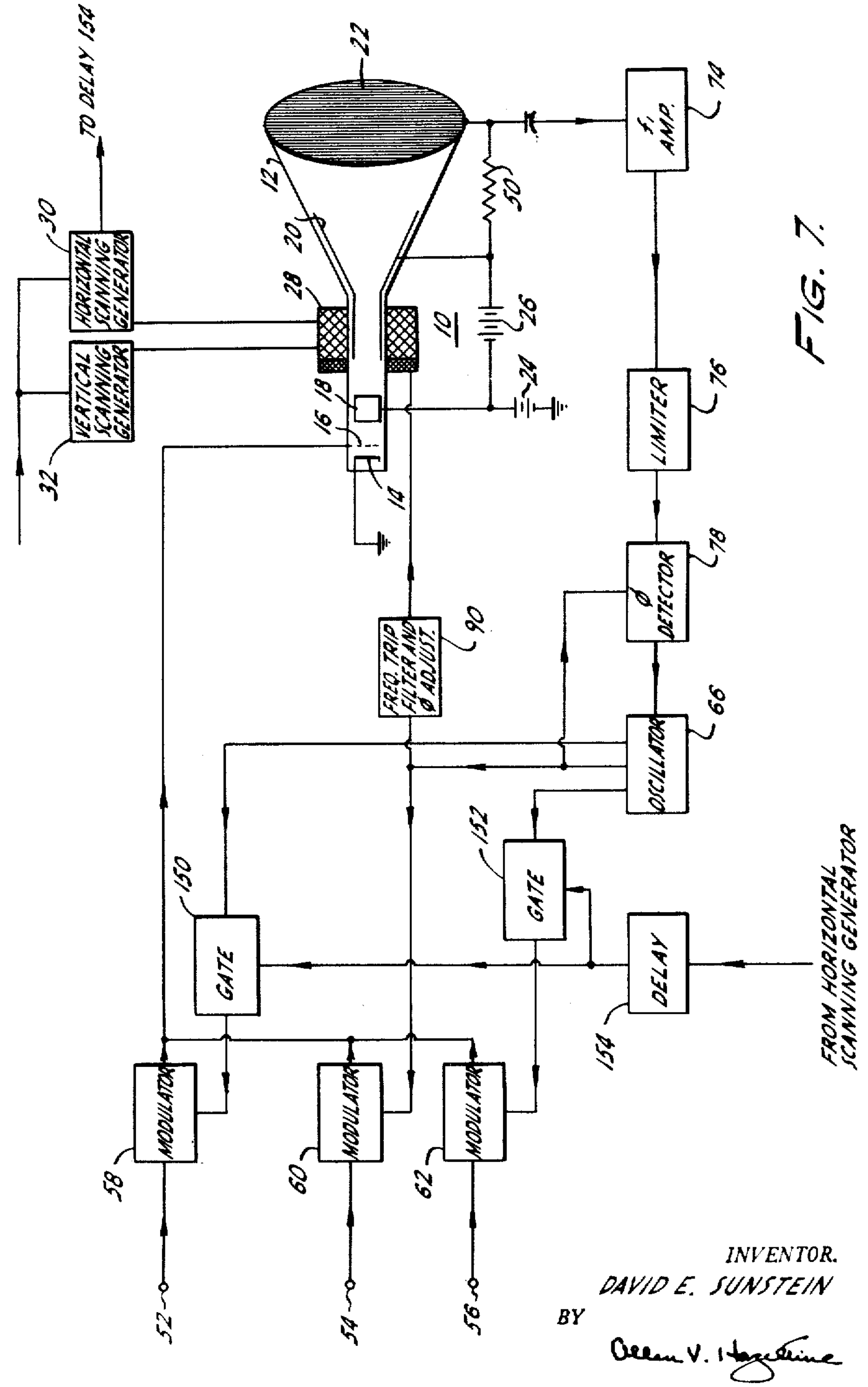
Figure 7 is a block diagram, partly schematic, showing another form of a cathode-ray tube system in accordance with the invention.

To simplify the system so far described, it may be desirable to eliminate the need for the amplifier 80, the gate 82 and the delay and phase inversion system 84. A system so modified is shown in Figure 7. In the system of Figure 7 those elements which are similar in function to the corresponding elements of Figure 1 have been indicated by the same reference numerals.

In the arrangement shown in Figure 7, the cathode-ray tube 10, containing beam generating and accelerating electrodes 14, 16, 18 and 20, comprises an end face 22 provided with a screen structure which may be of any of the forms shown in Figures 2, 3, 4 or 5.

For the reproduction of a color image on the face plate of the cathode-ray tube, the signals indicative of the red, green and blue components of the image and appearing at input terminals 52, 54 and 56 are arranged in time reference sequence by means of modulators 58, 60 and 62 which are further energized by suitable phase displaced modulation signals derived from the oscillator 66. In the arrangement specifically shown in Figure 7, the modulators 58, 60 and 62 are arranged to transmit the reference level component definitive of brightness of the input signals applied thereto, thereby obviating the need for the band-pass filters 68, 70 and 72 and the adder 64 of the system of Figure 1. The phase relationship of the signals from the oscillator 66 is determined by the relative phase position of the phosphor stripes of each of the color groups formed on the face plate 22 and, in the case of uniformly arranged phosphor stripes such as shown in Figures 2, 3 and 4, the modulation signals bear a 120° phase relationship whereas, in the case of phosphor stripes arranged in a four-line pattern as shown in Figure 5, the modulation signals have a quadrature phase relationship of 0°, 90° and 180° respectively, as previously described.

In order to produce the desired synchronism between the contemporaneous value of the video color signal applied to control electrode 16 and the scanning of the phosphor stripes, the phase position of the composite wave generated by modulators 58, 60 and 62 is controlled by varying the relative phase of the modulating signals from oscillator 66 in consonance with the phase (and/or frequency) variations of a main indexing signal generated across load impedance 50. This indexing signal is generated during the scanning of the image producing area of the beam intercepting structure, in the manner previously described, and is supplied to the oscillator 66 through the amplifier 74, the limiter 76 and the phase detector 78, the amplifier 74 having a band-pass characteristic selectively transmitting an indexing signal at a frequency harmonically related to the rate of scanning the groups of phosphor stripes as established by the rate of scanning the individual phosphor stripes. Thus, in systems embodying screen structures of the types shown in Figures 2, 3 and 4, the amplifier 74 is adapted to transmit selectively an indexing signal having a frequency equal to three—or multiples of three—times the rate of scanning the groups of phosphor stripes, whereas, in a system embodying a screen structure of the type shown in Figure 5, the amplifier 74 is adapted to transmit selectively an indexing signal having a frequency equal to four—or multiples of four—times the rate of scanning the groups of phosphor stripes.

In order to avoid the possibility that the oscillator 66 may synchronize with the wrong peak of the main indexing signal, the oscillator 66 is controlled by means of an auxiliary indexing signal which is applied to the oscillator at the start of each line scansion of the image forming portion of the screen structure.

The auxiliary indexing signal is derived, from auxiliary indexing stripes arranged on the marginal edge portion of the screen structure, as a harmonic component of the generated pulses and is applied as a control quantity to the oscillator 66 through the same path as the main indexing signal. More particularly, while the pulses produced across the load impedance 50 during the scanning of the marginal edge portion of the screen structure recur at the rate of scanning the groups of phosphor stripes, these pulses nevertheless contain harmonic components having a frequency equal to the rate of scanning the phosphor stripes. In the system of Figure 7, the appropriate harmonic component is selected by the band-pass amplifier 74 and applied as a control quantity, at the same nominal frequency as the main indexing signal, to the oscillator 66 by way of the phase detector 78 in the same manner as the main indexing signal.

In order to insure that the oscillator is synchronized with the proper peak of the auxiliary control quantity so produced, the system of Figure 7 further comprises means to periodically cut-off and energize the beam of the cathode-ray tube 10 during the scanning of the marginal edge portion so that the beam is energized only during those intervals of its scanning across the auxiliary indexing stripes when the auxiliary indexing signal produced thereby has the proper phase relationship. In the arrangement shown, this control of the beam is obtained by means of first and second gates 150 and 152 respectively, which effectively open the signal paths between the input terminals 52 and 56 respectively, and the control electrode 16 of the tube during the scanning of the marginal edge portion of the screen structure. In the specific arrangement shown, the paths under consideration are effectively opened by opening the paths of the modulation signals from the oscillator 66 to the modulators 58 and 62 respectively.

The gates 150 and 152, which may be similar to the gate 82 of the system of Figure 1, may be made nonconductive during the scanning of the marginal edge portion of the screen structure by means of a negative pulse derived from the horizontal scanning generator 30 and applied to the gates 150 and 152 through a delay system 154. Since the signal applied to the electrode 16 of tube 10 is restricted solely to that derived from the input terminal 54 during the scanning of the marginal edge portion of the screen structure, and since the peak value of this signal occurs at a phase established by the modulating signal applied to the modulator 60, it is insured that an auxiliary indexing pulse is produced across load impedance 50 only when the peak of the signal and the impingement of one of the auxiliary index stripes by the scanning beam are in phase coincidence. Furthermore, since the absolute phase position of the signal from modulator 60 is determined by the oscillator 66 and since the auxiliary indexing signal is generated only when a phase coincidence exists between the peak of the modulated signal and the impingement of the auxiliary index stripe, the synchronization of the oscillator 66 can occur only when this phase coincidence obtains. Accordingly, there can be no ambiguity of the phase at which the oscillator is synchronized notwithstanding the harmonic relationship of the auxiliary index control quantity applied to the phase detector 78 and the synchronized frequency of the oscillator 66.

As a general rule, it is desirable that the oscillator 66 exhibit a free running frequency sufficiently different from its synchronized frequency so that a phase coincidence between the peak of the signal applied to electrode 16 and the impingement of the auxiliary indexing stripes recurs two or more times during the scanning of the marginal edge portion of the screen structure. Alternatively, the system may be arranged so that the velocity at which the marginal edge portion is scanned is sufficiently different from the nominal scanning velocity of the image forming portion of the screen structure so that this multiple phase coincidence is produced. Under these conditions a sufficient number of auxiliary indexing pulses are generated across load impedance 50 to insure an auxiliary indexing signal of sufficient magnitude to control the oscillator 66.

While the invention has been described by means of systems in which a phase synchronous relationship between the video signal applied to the intensity control element of the cathode-ray tube and the scanning of the phosphor stripes is achieved by control of the phase of video signal, it is readily apparent to those skilled in the art that this phase synchronous relationship may also be obtained by controlling the scanning velocity of the cathode-ray beam. Such a modification within the scope of the invention, may be achieved by means of a variable frequency deflection system controlled by the indexing signals generated in accordance with the invention.

While I have described my invention by means of specific examples and in specific embodiments, I do not wish to be limited thereto for obvious modifications will occur to those skilled in the art without departing from the spirit and scope of the invention.

What I claim is:

1. A cathode-ray tube system comprising a cathode-ray tube having a source of a beam of charged particles and a beam intercepting member, said beam intercepting member comprising a plurality of groups each of a plurality of discrete first elemental areas having a first given response characteristic upon impingement by said charged particles and comprising second elemental areas having a second given response characteristic upon impingement by said charged particles detectably different from the response characteristic of said first elemental areas, the said first elemental areas recurring throughout part of each of said groups at a given periodicity equal to an integer multiple of the periodicity of said groups, said second elemental areas recurring at a periodicity which is an integral multiple of the periodicity of said groups of first elemental areas, means for scanning said beam across said first and second elemental areas thereby to energize said first and second areas and to produce variations in said second response characteristic at rates equal to the fundamental and to higher harmonics of the rate of beam scanning across successive ones of said second elemental areas, output means coupled to said beam intercepting member and responsive to said variations to produce a signal quantity having a signal component which varies at one of said higher harmonic rates, and means coupled to said output means for selectively deriving said signal component from said signal quantity.

2. A cathode-ray tube system as claimed in claim 1 wherein the said periodicity of said first elemental areas has a value substantially equal to three times the periodicity of said groups, and wherein the said variations of said component of said signal quantity recur at a rate equal to the periodicity of said first elemental areas.

3. A cathode-ray tube system as claimed in claim 1 wherein the said periodicity of said first elemental areas has a value substantially equal to four times the periodicity of said groups, and wherein the said variations of said component of said signal quantity recur at a rate equal to the periodicity of said first elemental areas.

4. A cathode-ray tube system as claimed in claim 2 wherein said first elemental areas comprise stripes of phosphor material arranged at 120° phase position intervals and said second elemental areas comprise stripes of a material having a secondary-electron emissivity different from that of said phosphor stripes.

5. A cathode-ray tube system comprising a cathode-ray tube having a source of a beam of charged particles and a beam intercepting member, said beam intercepting member comprising a plurality of groups each of a plurality of discrete first elemental areas having a first given response characteristic upon impingement by said charged particles and comprising second elemental areas having a second given response characteristic upon impingement by said charged particles detectably different from the response characteristic of said first elemental areas, the said first elemental areas recurring throughout part of each of said groups at a given periodicity equal to an integer multiple of the periodicity of the said groups, said second elemental areas recurring at a periodicity which is an integral multiple of the periodicity of said groups of first elemental areas, means for scanning said beam across said first and second elemental areas thereby to energize said first and second areas and to produce variations in said second response characteristic at rates equal to the fundamental and to higher harmonics of the rate of beam scanning across successive ones of said second elemental areas, output means coupled to said beam intercepting member and responsive to said variations to produce a signal quanity having a signal component which varies at one of said higher harmonic rates, means coupled to said output means for selectively deriving said signal component from said signal quantity, a source of a wave having a frequency proportional to the rate of scanning said groups of first elemental areas, and means responsive to said derived component of said signal quantity for synchronizing the frequency of said wave source.

6. A cathode-ray tube system comprising a cathode-ray tube having a source of a beam of charged particles and a beam intercepting member, said beam intercepting member comprising a signal intelligence indicating first portion and a second portion arranged at a marginal edge of said first portion, said first portion comprising a plurality of groups each of a plurality of discrete first elemental areas having a first given response characteristic upon impingement by said charged particles and comprising second elemental areas having a second given response characteristic upon impingement by said charged particles detectably different from the response characteristic of said first elemental areas, the said first elemental areas recurring throughout part of each of said groups at a given periodicity equal to an integer multiple of the periodicity of said groups, said second elemental areas being arranged in a geometrical configuration indicative of the geometrical configuration of said first elemental areas, said marginal edge portion comprising third elemental areas having a given response characteristic upon impingement by said charged particles and being arranged in a geometric configuration indicative of the geometrical configuration of said first elemental areas, means for scanning said beam across said first and second portions thereby to energize said first, second and third elemental areas, output means coupled to said beam intercepting member and responsive to the energization of said second and third elemental areas for producing a first signal quantity having a signal component having variations recurring at a rate equal to $n$ times the said given periodicity of said first elemental areas where $n$ is an integer and for producing a second signal quantity having a signal component having variations recurring at the rate of scanning said groups of first elemental areas, and means coupled to said output means for selectively deriving said signal components from said signal quantities.

7. A cathode-ray tube system as claimed in claim 6 wherein the said periodicity of said first elemental areas has a value substantially equal to three times the periodicity of said groups, and wherein the said variations of said component of said first signal quantity recur at a rate equal to the periodicity of said first elemental areas.

8. A cathode-ray tube system as claimed in claim 6 wherein the said periodicity of said first elemental areas has a value substantially equal to four times the periodicity of said groups, and wherein the said variations of said component of said first signal quantity recur at a rate equal to the periodicity of said first elemental areas.

9. A cathode-ray tube system as claimed in claim 6 wherein said cathode-ray tube comprises means to vary the intensity of said beam and further comprising means to apply to said beam intensity varying means a wave having variations indicative of desired variations of the response of said first elemental areas, and means responsive to said component of said first signal quantity to vary the time-phase position of said wave during the scanning of said signal intelligence indicating portion by said beam and responsive to the said component of said second signal quantity to vary the time-phase position of said wave during the scanning of said marginal edge portion by said beam.

10. A cathode-ray tube system for producing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising consecutively arranged groups of phosphor stripes, the stripes of each of said groups being adapted to produce light of different colors in response to electron impingement and being arranged in sequence at a given periodicity over part of each of said groups, said image forming portion further comprising first elemental areas having a given response characteristic upon electron impingement different from the response characteristic of said phosphor stripes and being arranged in a geometric configuration indicative of the geometrical configuration of said phosphor stripes, said marginal edge portion comprising second elemental areas having a given response characteristic upon electron impingement and being arranged in a geometric configuration indicative of the geometric configuration of said groups of phosphor stripes, means to apply to said intensity varying means a wave having variations indicative of desired variations of the response of said phosphor stripes, means for scanning said image forming and marginal edge portions to thereby impinge said beam on said phosphor stripes and on said elemental areas thereby to energize said phosphor stripes and to produce signal quantities proportional to the response characteristics of said first and second elemental areas, and means to derive from said signal quantities a first control quantity having variations recurring at a rate equal to *n* times the said given periodicity of said phosphor stripes where *n* is an integer and a second control quantity having variations recurring at the rate of scanning said groups of phosphor stripes.

11. A cathode-ray tube system as claimed in claim 10 wherein said phosphor stripes are arranged substantially parallel in a given direction and wherein said beam scans said intercepting member in a direction transverse to said given direction, and further comprising means to retard the scanning of said phosphor stripes during intervals of impingement of said beam on said phosphor stripes.

12. A cathode-ray tube system for producing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising consecutively arranged groups of three phosphor stripes, the stripes of each of said groups being adapted to produce light of different colors in response to electron impingement and being arranged in a given direction in sequence at a given periodicity over part of each of said groups, each of said groups comprising an elemental area having a given response characteristic upon electron impingement different from the response characteristic of said phosphor stripes, said marginal edge portion comprising a plurality of second elemental areas having a given response characteristic upon electron impingement, said second elemental areas having a geometric configuration indicative of the geometric configuration of said groups of phosphor stripes and having a periodicity equal to the periodicity of said groups of phosphor stripes, means to apply to said intensity varying means a wave having variations indicative of desired variations of the response of said phosphor stripes, means for scanning said beam across said marginal and image forming portions in a direction transverse to said phosphor stripes to thereby impinge said beam on said elemental areas and on said phosphor stripes thereby to energize said phosphor stripes and to produce signal quantities proportional to the response characteristics of said first and second elemental areas, and means to derive from said signal quantities a first control quantity having variations recurring at a rate equal to the periodic rate of said phosphor stripes and a second control quantity having variations recurring at the rate of scanning said second elemental areas of said marginal edge portion.

13. A cathode-ray tube system as claimed in claim 12 wherein said means to derive said second control quantity comprises means to impart to said wave a predetermined amplitude at selected intervals during the scanning of said marginal edge portion by the said beam.

14. A cathode-ray tube system as claimed in claim 12 comprising a source of a signal controlling the time-phase position of the variations of said wave, means to apply said first control quantity to said source to thereby control the time-phase position of said wave during the scanning of said image generating portion, and means to apply said second control quantity to said source to thereby control the time-phase position of said signal of said source during the scanning of said marginal edge portion of said beam intercepting member.

15. A cathode-ray tube system as claimed in claim 14 wherein the said elemental areas of said image generating portion and of said marginal edge portion consist of materials having secondary-electron emissivities different from the secondary-electron emissivity of said phosphor stripes.

16. A cathode-ray tube system as claimed in claim 14 wherein the said signal source comprises a signal generator, and further comprising means coupled to said deflecting means to quench said generator at the end of each line scansion of said beam over said beam intercepting member.

17. A cathode-ray tube system as claimed in claim 14 comprising means responsive to said deflection means to apply said second control quantity to said signal source only during the scanning of the said marginal edge portion by said beam.

18. A cathode-ray tube system for producing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising consecutively arranged groups of three phosphor stripes, the stripes of each of said groups being adapted to produce light of different colors in response to electron impingement and being substantially uniformly distributed throughout the group, each of said groups comprising an elemental area having a given response characteristic different from the response characteristic of said phosphor stripes, said marginal edge portion comprising a plurality of second elemental areas spaced apart with a geometrical configuration indicative of the geometrical configuration of said groups of phosphor stripes and with a periodicity equal to the periodicity of said groups of phosphor stripes, said second elemental areas having a given response characteristic upon electron impingement different from the response characteristic of intervening areas of said marginal edge portion, means to apply to said intensity varying means a wave having variations indicative of desired variations of the response of said phosphor stripes, means for scanning said beam across said image forming and said marginal edge portions in a direction transverse to said phosphor stripes to thereby impinge said beam on said phosphor stripes and on said elemental areas, thereby to energize said phosphor stripes and to produce signal quantities proportional to the response characteristics of said first and second elemental areas, means to derive from said signal quantities a first control quantity having variations recurring at the rate of scanning the said phosphor stripes of said image generating portion and a second control quantity having variations recurring at the rate of scanning said second elemental areas of said marginal edge portion, and means responsive to said first control quantity to control the time-phase position of said wave during the scanning of said image generating portion by said beam and responsive to said second control quantity to control the time-phase position of said wave during the scanning of said marginal edge portion.

19. A cathode-ray tube system as claimed in claim 18 wherein the said first elemental area of each of said groups comprises a stripe of a material having a given response characteristic upon electron impingement arranged over one of the phosphor stripes of each of said groups.

20. A cathode-ray tube system as claimed in claim 19 wherein said means to derive said first control quantity comprises a signal transmission system adapted selectively to derive the third harmonic component of the signal quantity produced by the scanning of the said beam over the said first elemental areas.

21. A cathode-ray tube system for producing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising a plurality of spaced groups of stripes of phosphor material, the stripes of each of said groups and the spacing between adjacent groups defining a pattern of given geometrical configuration, the stripes of each group being arranged at substantially 90° intervals and being adapted to produce light of different colors upon impingement by electrons and the spacings between adjacent groups defining elemental areas having a given response characteristic upon electron impingement different from the response characteristic of said phosphor stripes, said marginal edge portion comprising a plurality of second elemental areas spaced apart and having a geometrical configuration indicative of the geometrical configuration of said groups of phosphor stripes and having a periodicity equal to the periodicity of said groups of phosphor stripes, said second elemental areas having a given response characteristic upon electron impingement different from the response characteristic of intervening areas of said marginal edge portion, means to apply to said intensity varying means a wave having variations indicative of desired variations of the response of said phosphor stripes, means for scanning said beam across said image generating and marginal edge portions in a direction transverse to the said phosphor stripes to thereby impinge said beam on said phosphor stripes and on said elemental areas thereby to energize said phosphor stripes and to produce signal quantities proportional to the response characteristics of said first and second elemental areas, means to derive from said signal quantities a first control quantity having variations recurring at the rate of scanning the said phosphor stripes of said image forming portion and a second control quantity having variations recurring at the rate of scanning said groups of phosphor stripes, and means responsive to said first control quantity to control the time phase position of said wave during the scanning of said image generating portion by said beam and responsive to said second control quantity to control the time-phase position of said wave during the scanning of said marginal edge portion.

22. A cathode-ray tube system as claimed in claim 21 wherein said means to derive said first control quantity comprises a signal transmission system adapted selectively to derive the fourth harmonic component of the signal quantity produced by the scanning of the said beam over the said first elemental areas.

23. A cathode-ray tube system for reproducing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising consecutively arranged groups of phosphor stripes, the stripes of each of said groups being adapted to produce light of different colors in response to electron impingement, each of said groups comprising an elemental area having a given response characteristic upon electron impingement different from the response characteristic of said phosphor stripes, said marginal edge portion comprising a plurality of spaced second elemental areas having a given response characteristic upon electron impingement different from the response characteristic of intervening areas of said marginal edge portion, said second elemental areas having a periodicity equal to and a geometric configuration indicative of the periodicity and geometrical configuration of said groups of phosphor stripes, means for scanning said beam across said image generating and marginal edge portions in a direction transverse to said phosphor stripes to thereby impinge said beam on said elemental areas and on said phosphor stripes thereby to energize said phosphor stripes and to produce signal quantities proportional to the response characteristic of said first and second elemental areas, means to derive from said signal quantities a first control quantity having variations recurring at the rate of scanning said phosphor stripes and a second control quantity having variations recurring at the rate of scanning said groups of phosphor stripes, input means for three signals each defining a given primary color aspect of the image to be reproduced, a source of an oscillation having a frequency substantially equal to the rate of scanning said groups of phosphor stripes, means to derive from said source three modulation signals arranged in given phase relationship, means to combine each of said input signals with a different one of said modulation signals to produce a composite wave having variations indicative of desired variations of the response of said phosphor stripes, phase detecting means energized by said first control quantity and said oscillation and adapted to produce a control wave indicative of variations of the phase relationship of said first control quantity and said oscillation, means for applying said control wave to said oscillation source to thereby control the phase of said modulation signals during the scanning of said image generating portion, means to apply said second control quantity to said oscillation source to thereby control the phase of said modulation signals during the scanning of said marginal edge portion by said beam, means responsive to said deflection means to render inactive said second control quantity during the scanning of said image generating portion, and means responsive to said deflection means to quench said oscillation source during intervals between successive scansions of said beam intercepting member.

24. A cathode-ray tube system for reproducing a color television image, comprising a cathode-ray tube having a source of an electron beam, means to vary the intensity of said beam, and a beam intercepting member, said beam intercepting member comprising an image generating portion and a second portion arranged at a marginal edge of said first portion, said image generating portion comprising consecutively arranged groups of phosphor stripes, the stripes of each of said groups being adapted to produce light of different colors in response to electron impingement, each of said groups comprising an elemental area having a given response characteristic upon electron impingement different from the response characteristic of said phosphor stripes, said marginal edge portion comprising a plurality of second elemental areas spaced apart and having a given response characteristic upon electron impingement different from the response characteristic of intervening areas of said marginal edge portion, said second elemental areas having a periodicity equal to and a geometric configuration indicative of the periodicity and geometrical configuration of said groups of phosphor stripes, means for scanning said beam across said marginal and image forming portions in a direction transverse to said phosphor stripes to impinge said beam on said phosphor stripes and said elemental areas thereby to energize said phosphor stripes and to produce signal quantities proportional to the response characteristics of said first and second elemental areas, input means for three signals each defining a given primary color aspect of the image to be reproduced, a source of oscillation having a frequency substantially equal to the rate of scanning said groups of phosphor stripes, means to derive from said source three modulation signals arranged in given phase relationship, means to combine each of said input signals with a different one of said modulation signals to produce a composite wave having variations indicative of desired variations of the response of said phosphor stripes, means to derive from said signal quantities a first control quantity having variations recurring at the rate of scanning said phosphor stripes, means responsive to said control quantity and coupled to said oscillation source for controlling the time-phase position of said oscillation during the scanning of said image forming portion by said beam, means to derive from said signal quantities a second control quantity having variations recurring during the scanning of said marginal edge portion by said beam at the rate of scanning said phosphor stripes, means to establish a predetermined phase relationship between the variations of said second control quantity and the scanning of said groups of phosphor stripes, said latter means comprising means responsive to said deflecting means to selectively render inactive the paths between two of said input means and said intensity varying means during the scanning of the said marginal edge portion and means to apply said second control quantity to said oscillation source during the scanning of said marginal edge portion by said beam, and means responsive to said deflection means to render said oscillation source inactive during intervals between successive scannings of said image generating portion.

25. A cathode ray tube system comprising a cathode-ray tube having a source of a beam of charged particles and a beam intercepting member, said beam intercepting member comprising a plurality of groups each of a plurality of discrete first elemental areas having a first given response characteristic upon impingement by said charged particles and comprising second elemental areas having a second given response characteristic upon impingement by said charged particles detectably different from the response characteristic of said first elemental areas, the said first elemental areas recurring throughout part of each of said groups at a given periodicity equal to an integer multiple of the periodicity of said groups, said second elemental areas recurring at a periodicity which bears to the periodicity of said groups of first elemental areas a ratio greater than unity, means for scanning said beam across said first and second elemental areas thereby to energize said first and second areas, output means coupled to said beam intercepting member and responsive to the energization of said second elemental areas for producing a signal quantity having a signal component having variations recurring at a rate equal to the rate of scanning of said beam across said second elemental areas, and frequency selective means coupled to said output means for deriving said signal component from said signal quantity.

References Cited in the file of this patent

UNITED STATES PATENTS

| | | |
|---|---|---|
| 2,250,528 | Gray | July 29, 1941 |
| 2,343,825 | Wilson | Mar. 7, 1944 |
| 2,446,440 | Swedlund | Aug. 3, 1948 |
| 2,490,812 | Huffman | Dec. 13, 1949 |
| 2,530,431 | Huffman | Nov. 21, 1950 |
| 2,545,325 | Weimer | Mar. 13, 1951 |
| 2,630,548 | Muller | Mar. 3, 1953 |
| 2,631,259 | Nicoll | Mar. 10, 1953 |
| 2,633,547 | Law | Mar. 31, 1953 |
| 2,689,927 | Bradley | Sept. 21, 1954 |

U. S. DEPARTMENT OF COMMERCE

PATENT OFFICE

CERTIFICATE OF CORRECTION

Patent No. 2,778,971

January 22, 1957

David E. Sunstein

It is hereby certified that error appears in the printed specification of the above numbered patent requiring correction and that the said Letters Patent should read as corrected below.

Column 7, line 70, for "potentiometer" read --potential--.

Signed and sealed this 6th day of May 1958.

(SEAL)
Attest:

KARL H. AXLINE

Attesting Officer

ROBERT C. WATSON
Commissioner of Patents